(12) United States Patent
Vare et al.

(10) Patent No.: US 8,792,596 B2
(45) Date of Patent: Jul. 29, 2014

(54) TRANSMISSION PARAMETER INFORMATION

(75) Inventors: Jani Vare, Turku (FI); Jarno Kallio, Turku (FI); Matti Puputti, Turku (FI); Pekka Talmola, Turku (FI)

(73) Assignee: Nokia Corporation, Espoo (FI)

(*) Notice: Subject to any disclaimer, the term of this patent is extended or adjusted under 35 U.S.C. 154(b) by 1582 days.

(21) Appl. No.: 10/551,122

(22) PCT Filed: Mar. 25, 2004

(86) PCT No.: PCT/IB2004/001077
§ 371 (c)(1),
(2), (4) Date: Nov. 13, 2006

(87) PCT Pub. No.: WO2004/086656
PCT Pub. Date: Oct. 7, 2004

(65) Prior Publication Data
US 2007/0133497 A1 Jun. 14, 2007

(30) Foreign Application Priority Data
Mar. 25, 2003 (GB) .................................. 0306840.0

(51) Int. Cl.
*H04L 27/06* (2006.01)

(52) U.S. Cl.
USPC ........... 375/342; 370/252; 370/345; 375/260; 375/377

(58) Field of Classification Search
USPC .......... 370/311, 203, 252, 345; 375/219, 260, 375/267, 295, 316, 354, 363, 365–366, 342, 375/377
See application file for complete search history.

(56) References Cited

U.S. PATENT DOCUMENTS

| 6,920,179 B1 | 7/2005 | Anand et al. ............. 375/240.26 |
| 7,099,353 B2* | 8/2006 | Hosur ........................... 370/510 |
| 7,106,705 B1* | 9/2006 | Mecklenbrauker et al. .. 370/329 |

(Continued)

FOREIGN PATENT DOCUMENTS

| EP | 0 808 073 A2 | 11/1997 |
| EP | 1071221 A1 | 1/2001 |

(Continued)

OTHER PUBLICATIONS

Ahmavaara et al., "Broadcast and Multicast Services in Mobile Networks", Nokia Networks, Published first: XVIII World Telecommunications Congress 2002, Paris, France, Sep. 22-27, 2002.

(Continued)

*Primary Examiner* — Sophia Vlahos
(74) *Attorney, Agent, or Firm* — Harrington & Smith (57) ABSTRACT

According to an embodiment of the invention, an apparatus includes a decoder configured to decode transmission parameter signaling data from a signal, the signal including the transmission parameter signaling data on a lower level than a level on which service information is included; and a determiner configured to determine from decoded transmission parameter signaling data if the signal carries time-sliced elementary streams and configured to determine from the decoded transmission parameter signaling data whether the signal has a forward error correction framing structure, wherein the apparatus is a receiver and is configured to operate in a network. The apparatus further includes a controller configured to disregard a signal in response to determining that the signal does not carry time-sliced elementary streams.

4 Claims, 4 Drawing Sheets

(56) References Cited

U.S. PATENT DOCUMENTS

| | | | |
|---|---|---|---|
| 7,130,313 B2 * | 10/2006 | Pekonen | 370/473 |
| 7,197,022 B2 * | 3/2007 | Stanwood et al. | 370/337 |
| 7,277,432 B2 * | 10/2007 | Liang et al. | 370/389 |
| 7,567,537 B1 * | 7/2009 | Gurbuz et al. | 370/338 |
| 2002/0041608 A1 | 4/2002 | Choi et al. | 370/535 |
| 2002/0054578 A1 | 5/2002 | Zhang et al. | 370/328 |
| 2006/0013153 A1 * | 1/2006 | Vare et al. | 370/311 |

FOREIGN PATENT DOCUMENTS

| | | |
|---|---|---|
| GB | 2 366 137 A | 2/2002 |
| GB | 2 375 923 A | 11/2002 |
| WO | WO 02/11329 A1 | 2/2002 |
| WO | WO 03/045064 A1 | 5/2003 |
| WO | WO 03/069885 A2 | 8/2003 |
| WO | WO 2004/008688 A1 | 1/2004 |
| WO | WO 2004/066652 A1 | 8/2004 |

OTHER PUBLICATIONS

Vare et al., Nokia Ventures Organization: "Soft Handover in Terrestrial Broadcast Networks", Published first: IEEE International Conference on Mobile Data Management, Berkeley, California, USA, Jan. 19-22, 2004.

Final Draft ETSI EN 300 744 V1.5.1 (May 2004), "Digital Video Broadcasting (DVB); Framing Structure, Channel Coding and Modulation for Digital Terrestrial Television", (Jun. 2004), (pp. 1-64).

"Digital Video Broadcasting (DVB); Framing structure, channel coding and modulation for digital terrestrial television", ETSI EN 300 744 V1.2.1, Jul. 1999, 49 pgs.

Notice of Allowance, Republic of the Philippines, Jul. 16, 2009.

* cited by examiner

TRANSMISSION PARAMETER INFORMATION

FIELD OF THE INVENTION

This invention relates to transmission parameter information. In particular, the invention relates to the provision of and use of network type information in transmission parameter information.

BACKGROUND OF THE INVENTION

Digital broadcasting systems, such as various DVB-T (Terrestrial Digital Video Broadcasting) and DAB (Digital Audio Broadcasting) systems, ATSC, ISDB and other similar broadcasting systems allow for a system comprising transmitters arranged in a cellular fashion, allowing signal reception of a suitable quality over a geographical area through suitable transmitter site selection. The cellular nature of the transmitters' coverage allows mobile receivers to be able to achieve satisfactory performance even when moving. Steps are being taken to incorporate DVB receivers into mobile telephones and Personal Digital Assistants (PDAs), for which applications the DVB standards were not primarily designed. Steps are also being taken to provide services over DVB transmissions. A user may buy services using, for example, the telephone or other data transceiver forming part of the mobile telephone or PDA.

A receiver, on decoding the transmission parameter information like the Transmission Parameter Signalling (TPS) data in DVB for a received signal, can use it in certain decision making processes. In particular, a DVB-T receiver in a mobile device can use the cell identification information to eliminate some candidate signals in a handover procedure.

A form of DVB is being tailored for use in mobile receiver environments. This is known as DVB handheld, or DVB-H. In DVB-H, Internet Protocol datacast (IPDC) services are time-sliced, resulting in data for a service being transmitted over a relatively short period of time with relatively high bandwidth. A mobile receiver then needs to receive data only during this short period of time, and its receiver can be switched off at other times. This has positive implications for power consumption in the mobile receiver. Time-slicing is not limited to DVB-H.

SUMMARY OF THE INVENTION

According to a first aspect of the invention there is provided a method of operating a receiver, the method comprising: decoding transmission parameter information from a signal; and determining from the decoded transmission parameter information if the signal carries time-sliced elementary streams.

To advantage, the transmission parameter information is transmitted on a lower level than service information. In the embodiments, service information is transmitted on a data level (OSI level 2) whereas TPS information is transmitted on a physical level (OSI level 1). The term 'level' will be understood to mean a layer in a protocol stack, such as but not limited to the OSI seven layer model.

These aspects of the invention can allow improved receiver operation. In particular, the invention can allow at least some irrelevant signals to be deselected or disregarded without necessarily requiring network information from the signal to be analysed, or even decoded. This is particularly important when identifying handover candidate signals, and when performing signal scan, for initialising a receiver with parameters needed for service discovery. In systems such as the DVB system, this is particularly advantageous since the service information, in a worst case, may be transmitted only once in a ten second interval, whereas the transmission parameter information may be available very quickly after achieving lock to the tuned signal. Since one TPS bit is transmitted in every DVB-T frame, all the TPS bits are available to the receiver after 64 DVB-T frames have been received. The inter-bit interval of TPS bits depends on the symbol speed of the signal. Typically all the TPS bits are received within 100 ms or less.

The method may further comprise determining from the decoded transmission parameter information if the signal relates to an Internet Protocol data cast network and/or if the signal has a different framing structure, for example a forward error correction framing structure. This can allow a receiver to identify signals which do not relate to a network type of interest, so that appropriate action can be taken to avoid the unnecessary use of receiver resources.

According to a second aspect of the invention, there is provided a receiver arranged to operate in a network, the receiver comprising: a decoder for decoding transmission parameter information from a signal; and a determiner for determining from decoded transmission parameter information if the signal carries time-sliced elementary streams.

According to a third aspect of the invention there is provided a method of forming a signal for transmission, the method comprising: creating service information; creating transmission parameter information including an indication of whether the signal carries time-sliced elementary streams; and including the service information on one level with the transmission parameter on a lower level to form the signal.

According to a fourth aspect of the invention there is provided apparatus for forming a signal for transmission, the apparatus being arranged for creating service information, for creating transmission parameter including an indication of whether the signal carries time-sliced elementary streams, and for including the service information on one level with the transmission parameter information on a lower level to form the signal.

According to a fifth aspect of the invention there is provided a transmission parameter signalling data signal comprising a predetermined number of data bits defined over consecutive orthogonal frequency division multiplex symbols, the data signal comprising at a predetermined location a group of one or more information bits having a state dependent on whether a signal to which the data signal relates carries time-sliced elementary streams.

In the DVB-T standard, the predetermined number of bits is sixty eight, defined as bit numbers zero to sixty seven, and the predetermined location is between bit numbers forty eight to fifty three.

The group of information bits may have a state dependent on whether the data signal relates to a network of the Internet protocol data cast type, and/or dependent on whether the time-sliced elementary streams have a different framing structure, for example a forward error correction framing structure.

Another aspect of the present invention provides a method of operating a receiver which is arranged to operate in a network in which transmission parameter information is transmitted on a lower level than service information, (e.g. presented in physical layer (OSI layer 1), while the PSI/SI information is presented in data link layer (OSI layer 2)), the method comprising: decoding transmission parameter information from a signal; determining from the decoded transmission parameter information if the signal relates to a suitable network type; and disregarding the signal in the event of a negative determination. Also provided is a corresponding receiver.

Another aspect of the present invention provides a method of forming a signal for transmission, the method comprising: creating service information; creating transmission parameter information including an indication of a type of network to which the signal relates; and including the service information on one level with the transmission parameter on a lower level to form the signal. There is also provided corresponding apparatus.

Embodiments of the present invention will now be described, by way of example only, with reference to the accompanying drawings.

DESCRIPTION OF THE PREFERRED EMBODIMENTS

The standards document EN 300 744 V1.4.1 published by the European Telecommunications Standards Institute (ETSI) specifies TPS carriers, which are used for signalling parameters related to the transmission scheme used. The TPS carriers are constituted at a physical layer, or OSI layer 1, of the communication protocol stack. The decoding of the TPS in a receiver allows the channel coding and modulation used in the transmission to be determined, which information is used in controlling the receiver to operate accordingly. The TPS data is defined over 68 consecutive OFDM (Orthogonal Frequency Division Multiplex) symbols, referred to as one OFDM Frame. The TPS data is transmitted in parallel on seventeen TPS carriers for the DVB 2K mode, and on 68 carriers for the 8K mode. Every TPS carrier in the same symbol conveys the same differentially encoded information bit. The TPS is transmitted as shown in Table 1.

TABLE 1

| Bit Numbers | Purpose/content |
| --- | --- |
| $S_0$ | Initiation |
| $S_1$–$S_{16}$ | Synchronisation Word |
| $S_{17}$–$S_{22}$ | TPS length indicator |
| $S_{23}$–$S_{24}$ | Frame Number (in a Super-Frame) |
| $S_{25}$, $S_{26}$ | Constellation (QPSK or 16 or 64 QAM) |
| $S_{27}$, $S_{28}$, $S_{29}$ | Hierarchy Information |
| $S_{30}$, $S_{31}$, $S_{32}$ | Code rate, HP stream |
| $S_{33}$, $S_{34}$, $S_{35}$ | Code rate, LP stream |
| $S_{36}$, $S_{37}$ | Guard Interval |
| $S_{38}$, $S_{39}$ | Transmission Mode (2k or 8k) |
| $S_{40}$–$S_{47}$ | Cell identifier |
| $S_{48}$–$S_{53}$ | Reserved for future use |
| $S_{54}$–$S_{67}$ | Error protection (BCH code) |

It should be noted that the synchronisation word takes one value for odd numbered frames and the inverse for even numbered frames in a Super-Frame. Also, the cell identifier is two bytes long, and is divided between successive Frames.

More important to some decision-making processes is the information received as service information (SI), which is described in detail in DVB standards document ETS 300 468. The standard document ISO/IEC 13818-1 specifies SI, which is referred to as Program Specific Information (PSI). The PSI/SI data provides information for enabling automatic configuration of a receiver to demultiplex and decode the various streams of programs within the multiplex signal. The PSI/SI data includes a Network Information Table (NIT), which provides information relating to the physical organisation of the multiplexes, also known as Transport Streams (TS), carried via a given network. A receiver can store the NIT contents, to minimise access time when switching between channels. The PSI/SI data forms part of the data layer, or OSI layer 2, of the communication protocol stack.

A receiver, also known as an Integrated Receiver/Decoder (IRD) detects parameters of a prevailing signal and/or network by filtering and parsing a received PSI/SI table. From this information, an IRD can determine whether or not a signal is a valid handover candidate. However, since typically PSI/SI tables may be transmitted in any interval from 25 milliseconds to 10 seconds, depending on the table (e.g. maximum interval for NIT table is 10 seconds), and since the PSI/SI information is transmitted on a data layer (i.e. OSI level 2), signal scanning and handover processes can be expected to involve utilisation of a significant amount of the processing, receiver and power resources of the IRD, as well as being time consuming. This is of particular importance as regards power consumption in battery-operated mobile handheld devices.

Figure 1:
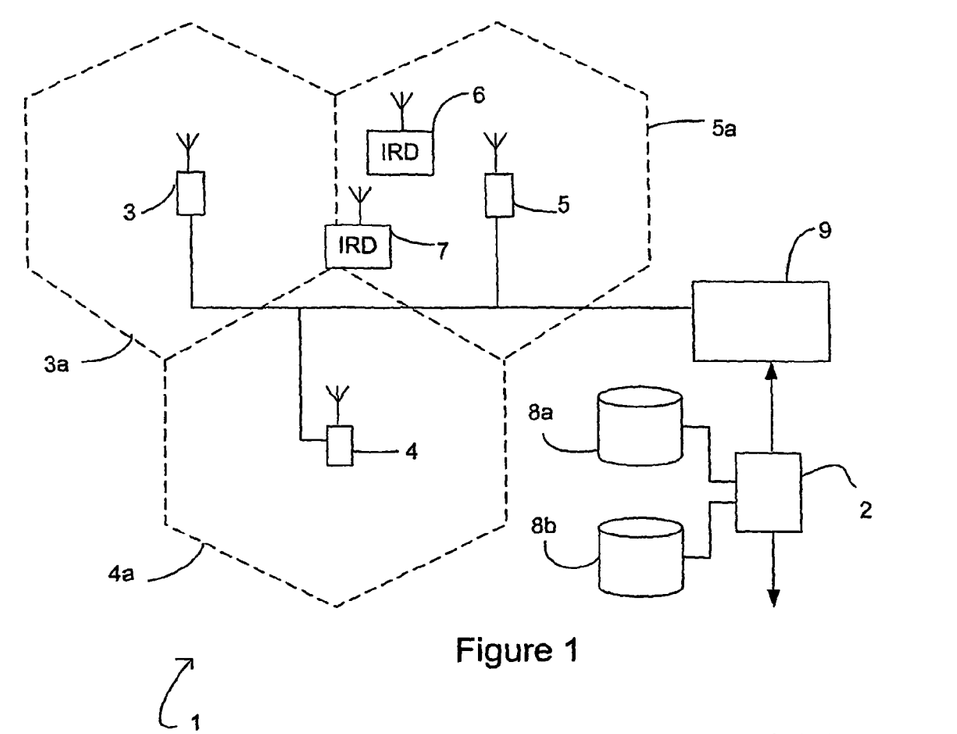
FIG. 1 is a schematic drawing of a digital video broadcast system, including components operating according to the invention.

Referring firstly to FIG. 1, a digital video broadcasting (DVB) system is shown generally at 1. The system comprises a content provider station 2, which is connected by suitable links to each of first, second and third transmitter stations 3,4,5. The transmitter stations 3-5 are separated from each other at locations selected such as to provide suitable coverage of the surrounding geography. In FIG. 1, the transmitters 3-5 are shown having respective coverage areas 3a, 4a and 5a, although it will be appreciated that in practice the area covered by a given transmitter will not be so regular and that there will be significant amount of overlap between the coverage areas 3a-5a. Also shown in FIG. 1 are first and second integrated receiver/decoders (IRD) 6, 7. The content provider 2 has access to sources of content 8a, 8b, such as audio-visual content, data files or images. The content is transmitted using IP over DVB-T network, in what is known as an IP Datacasting (IPDC) service, and preferably using time-slicing, to one or more of the IRDs 6,7, which are configured to receive data from at least two different communication channels. The IRDs 6, 7 in this embodiment are mobile devices that may be incorporated in mobile telephones or personal digital assistants (PDA), for example.

The content data is transmitted to a network element 9, which is a server configured to receive the content data and to generate recovery data for use in forward error correction of the content data. The content data is transmitted to the IRDs 6, 7 via the transmitters 3-5. The recovery data is transmitted to the IRDs in one embodiment of the invention via a second communication channel provided for example by a Third Generation (3G) mobile network (not shown). It should be noted that the communication paths for the content and recovery data are described with reference to and shown in FIG. 1 in a simplified form. However, other elements such as further transmitters, network elements or networks may be situated in these communication paths Each IRD 6, 7 is able to receive and decode signals transmitted by any or all of the transmitters 3-5. Each of the transmitters 3-5 is substantially the same, and one is illustrated in FIG. 2.

Figure 2:
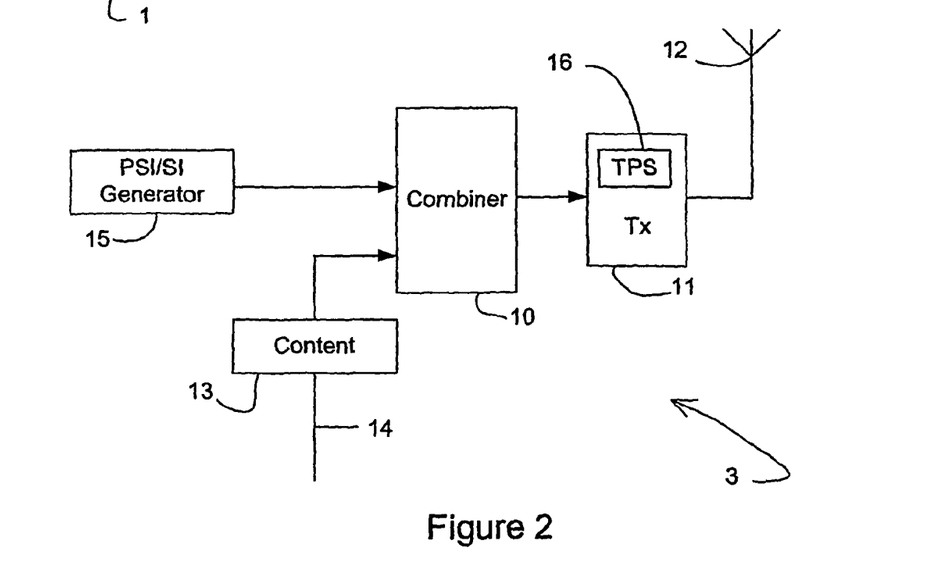
FIG. 2 is a schematic drawing of one of the transmitter stations of the system of FIG. 1.

Referring to FIG. 2, a transmitter station 3 is shown in schematic form, comprising generally a data source in the form of a combiner 10, a transmitter 11 and an antenna 12. The combiner 10 receives input data from a content provider 13, which is connected via an input 14 to the content provider 2 shown in FIG. 1. Also arranged to provide data to the combiner is a Program Specific Information (PSI) (or Service Information (SI)) data generator 15. The transmitter 11 includes a transmission parameter signalling (TPS) data generating device 16. The combiner 10 is arranged to source data from the content provider device 13 and the PSI/SI generator device 15 and to provide a data stream according to the DVB standards for inclusion with TPS data and subsequent transmission by the transmitter 11. According to the DVB broadcasting standards, data provided by the TPS generator 16 is included in the physical layer of the transmitted signals many times a second, whereas the PSI/SI generating device 15 data is included in the data layer of the transmitted signal and much less frequently, with up to 10 second intervals between data transmissions. As is conventional the PSI/SI generator 15 generates data representing a network information table (NIT), which is in accordance with the DVB standards. The transmitter 11 can therefore be considered to include transmission parameter information provided by the TPS generator 16 with service information provided as part of the data generated by the PSI/SI generator 15. The resultant signal can be considered as a composite signal, and it is the composite signal which is then transmitted by the transmitter 11 by way of the antenna 12. Of course, the composite signal also includes content data provided by the content generator 13, and other data which is outside the scope of this disclosure.

According to this one embodiment of the invention, the transmission parameter information generated by the TPS generator 16 includes the information shown below in table 2.

TABLE 2

| Bit Numbers | Purpose/Content |
| --- | --- |
| $S_{48}$ | Network Type |
| $S_{49}$ | Cell Size |
| $S_{50}$–$S_{51}$ | Current Cell Size |
| $S_{52}$ | Topology Information |
| $S_{53}$ | Time Slice Information |

Each of the transmitters 3-5 may transmit plural signals according to the DVB standards. In this connection, the transmitters 3-5 may include plural physical transmitters at a single location and sharing a common antenna. Each signal transmitted by a given one of the transmitters 3-5 may differ from other signals in terms of the frequency of the signal, the network type, the format of the transport stream, the network's topology, the transmitter power, and the nature of the multiplexing used. For example, multiplexing may be in a time-sliced nature, which is conceptually similar to time division multiplexing, or it may be that multiplexing is effected other than in the time domain. The types of transport stream which might be used will be known by those skilled in the art. The network type might be, for example, a DVB network or an Internet Protocol Data Cast (IPDC) network. The topology of the network might be single frequency or multiple frequency. A multiple frequency network might have transmissions on plural contiguous frequency bands. The DVB standards allow for bandwidths of 6, 7 and 8 MHz. The implementation of DVB in Europe will utilise signals having a bandwidth of 8 MHz.

The TPS data generated includes in bit $S_{48}$ an indicator of the type of network. A databit "0" indicates a network of the type DVB, whereas a databit "1" indicates a network of the type IPDC. In bit $S_{49}$ of the TPS data, a databit "0" indicates that all the cells in the network from which the signal is derived have the same size cell. A databit "1" indicates that cells in the network from which the signal is derived may have a different size to the other cells in the network. The current cell size is given by bits $S_{50}$ and $S_{51}$. In this embodiment, both of these databits being "0" indicates that the current cell has a diameter of less than 30 km. Databit $S_{50}$ taking a value of "0" and databit $S_{51}$ taking a value of "1" means that the current cell size has a diameter of between 30 and 40 km. Databit $S_{50}$ having a value of "1" and databit $S_{51}$ having a value of "0" means that the current cell has a diameter of between 40 and 50 km. If both of these bits has a value of "1" then the current cell size is greater than 50 km. The network topology being a single frequency network is indicated by bit $S_{52}$ having a value of "0" whereas a multifrequency network is indicated by this bit having a value of "1". A value of "0" being found for databit $S_{53}$ indicates that signal carries time-sliced elementary streams, whereas a value of "1" indicates that the signal does not carry such streams.

The TPS data transmitted by the transmitter 11 via the antenna 12 differs from conventional TPS data by the inclusion of information in the bits $S_{48}$ to $S_{53}$ thereof. The TPS data includes additionally one bit indicating the type of the network from which the signal originates, one bit identifying whether or not differing cell sizes are used in the network, two bits identifying the size of the current cell, one bit identifying network topology and one bit identifying whether or not time-sliced data forms part of the signal.

Figure 3:
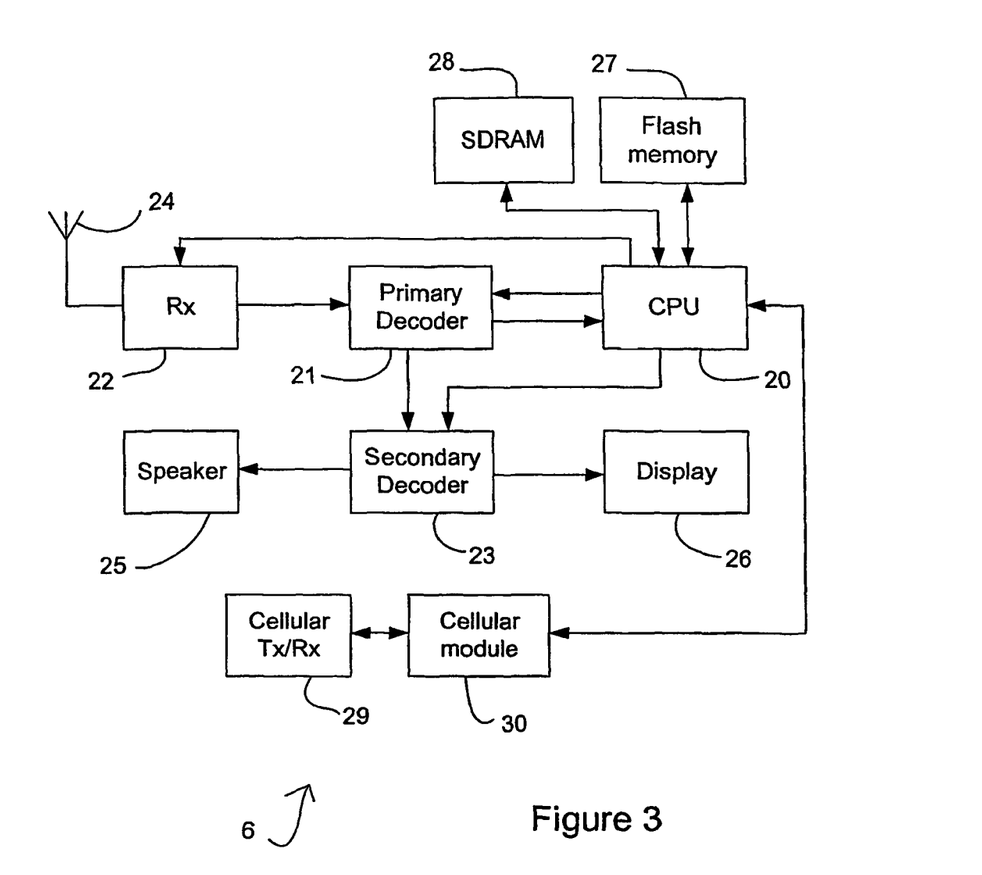
FIG. 3 is a schematic drawing of an integrated receiver/decoder of the system of FIG. 1.

The IRD 6,7 will now be described with reference to FIG. 3. Referring to FIG. 3, the IRD 6, is shown very schematically, comprising generally a central processing unit (CPU) 20, which is connected to control each of a primary decoder 21, a receiver 22, a second decoder, e.g. an MPEG-2 and IP (Internet Protocol) decoder 23, to a non-volatile flash memory 27, and to a volatile SDRAM memory 28.

The receiver 22 is connected to receive radio frequency signals via an antenna 24, and to provide demodulated signals to the decoder 21. The primary decoder 21 is arranged under control of the CPU 20 to provide decoded data both to the CPU and to provide MPEG or IP data to the secondary decoder 23. The secondary decoder 23 provides audio outputs to a speaker 25 and visual outputs to a display 26, whereby audiovisual content present in the signal received at the receiver 22 can be presented to a user. Although in this example IP and MPEG signals are able to be processed by a common decoder 23, it will be appreciated that separate decoders could be used instead.

The flash memory 27 is used to store data parsed from an NIT during signal scan. The SDRAM 28 is used to store some of the data used in earlier stages of a handover procedure.

In this embodiment, the IRD 6 also includes a transceiver 29 for allowing communication in a mobile telephone system, such as e.g. GSM, GPRS, 3G, UMTS for example, which is coupled to a corresponding mobile telephone and data handling module 30. The transceiver 29 and the module 30 allow the IRD 6 to operate as a telephone and mobile Internet portal, as well as to allow the user of the IRD to subscribe to services of interest which are communicated by data cast using the DVB network. This can be achieved in any convenient manner. For example, the user might send a request for service delivery to a mobile telephone operator with which the user subscribes using the UMTS components 29,30. The operator may then arrange for the service to be provided via DVB using an Internet service provider. Notifications of service delivery may be communicated to the IRD using the UMTS system or the DVB system.

The IRD 6 differs from conventional IRDs in that it is arranged to detect information forming part of TPS data, and to utilise that data appropriately. Operation of the IRD 6 in a signal scan procedure will now be described with reference to FIG. 4. It will be understood that the signal scan procedure is performed for initialising the receiver 6 with parameters needed for OSI layers 1 and 2 service discovery and for subsequently updating these parameters.

Figure 4:
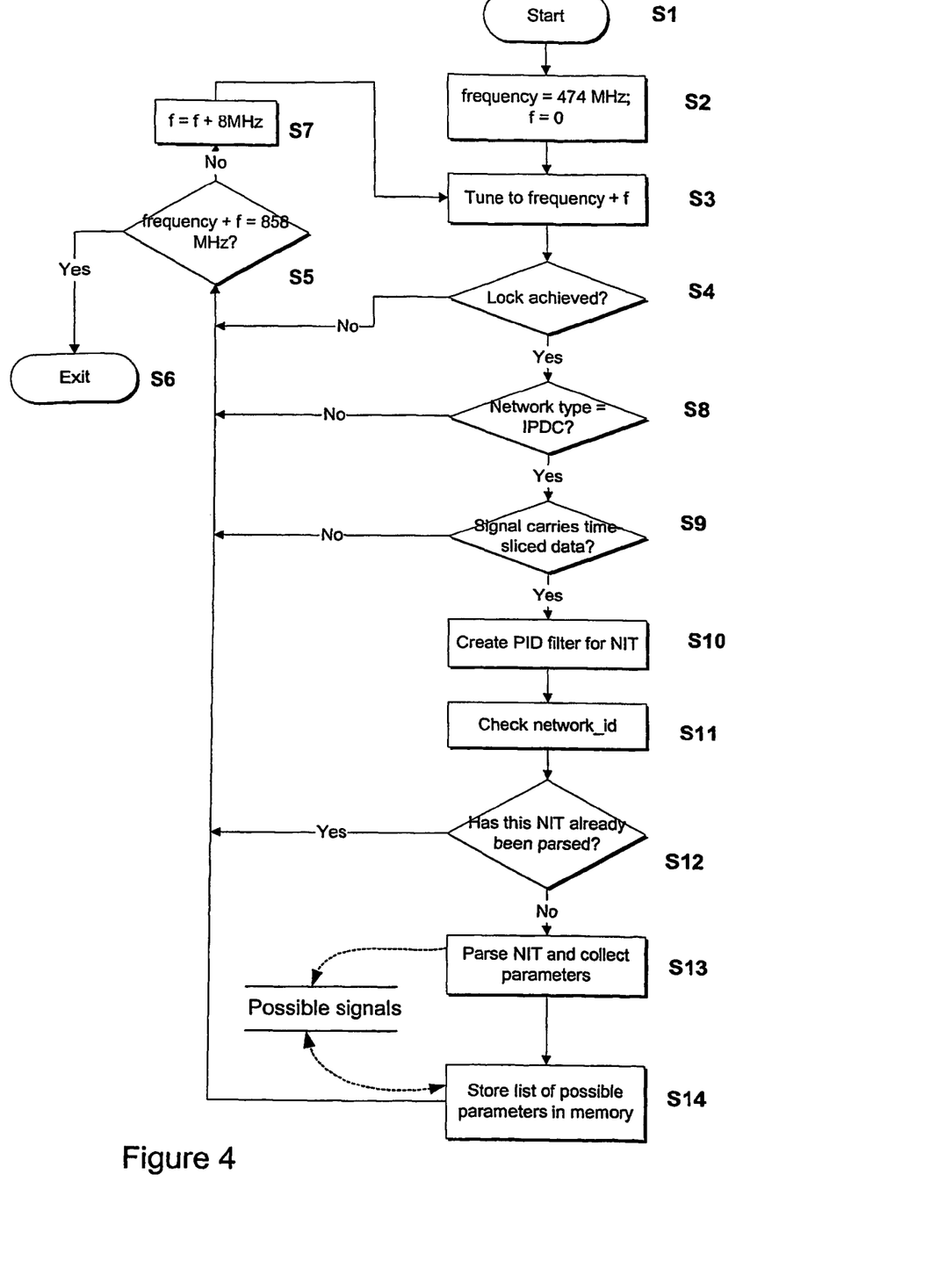
FIG. 4 is a flowchart illustrating operation of the integrated receiver/decoder of FIG. 3 in a signal scan procedure.

Referring to FIG. 4, the procedure is started at step S1. At step S2 a variable "frequency" is set to 474 MHz, and a variable "f" is set to a value of 0. At step S3 the receiver 22 is tuned to a frequency equal to "frequency" plus "f". At step S4, it is determined by the CPU 20 whether or not tuning lock is achieved. The absence of a tuning lock is used to infer that no signal of sufficient strength is being transmitted at that frequency. Accordingly, a negative determination to step S4 leads to step S5 where it is determined if the sum of the variables "frequency" and "f" is equal to 858 MHz. If a positive determination is made, it is inferred that the entire frequency band has been searched and the procedure proceeds to exit at step S6. Otherwise, the procedure advances to step S7, where the variable "P" is increased by 8 MHz and the procedure returns again to step S3.

When at step S4 tuning lock is achieved, the operation proceeds to step S8, where bit $S_{48}$ of the TPS data is examined by the CPU 20. If the examination reveals that bit $S_{48}$ is set to "0", it is inferred that the signal does not emanate from a network type IPDC and the procedure retreats to step S5. If, however, it is determined that the network type is IPDC, then the procedure advances to step S9. Here, bit $S_{53}$ of the TPS is examined, from where it is determined by CPU 20 whether or not the signal carries time-sliced data. If a negative determination is made, the procedure retreats to step S5; otherwise, the procedure advances to step S10.

At step S10, the PSI/SI data is decoded, and the NIT is examined. This examination involves the creation of a PID (Packet IDentifier) filter for the NIT forming part thereof At step S11, it is then determined what the identifier associated with the network is. At step S12, it is determined from the identifier of the network by the CPU 20 whether or not the NIT has already been filtered and parsed. If a negative determination is made, the procedure retreats to step S5. Otherwise, it is inferred that the signal which is being processed is a new signal, and the procedure progresses to step S13. Here, the NIT is parsed by the CPU 20 and the parameters needed for OSI layers 1 and 2 service discovery are collected therefrom. The relevant data is stored in an area temporary memory, indicated at "possible signals", at step S14. Following this, the procedure moves onto step S5, where the frequency is incremented.

The topology information given by bit $S_{52}$ may be used by the IRD 6 so that the procedure shown in FIG. 4 is not performed unnecessarily. In particular, once tuning lock has been achieved at step S4, and it is determined from examination of bit $S_{52}$ that the signal is transmitted in respect of a single frequency network, the IRD 6 makes arrangement such that the procedure is not performed again in respect of a different frequency, since this is deemed unnecessary.

As it can be seen, the procedure illustrated in FIG. 4 can allow for the de-selection of certain irrelevant signals even without the receiving and decoding of the NIT from the PSI/SI data. Since the TPS data is transmitted on a lower level than the NIT data, the procedure of FIG. 4 can allow the creation of a list of possible signals utilising fewer resources and in a shorter period of time than can be achieved using the prior art procedure. With this example, the TPS data is also transmitted more frequently.

In the conventional procedure for a signal scan, it would be necessary for each signal to receive and decode the NIT and to determine therefrom whether or not the signal included time-sliced data and whether or not the signal emanated from a network of a suitable type. Using the procedure of FIG. 4, however, some signals can be eliminated without the NIT being decoded. This is possible only because the TPS data transmitted by the transmitter 3 to 5 and received as the IRD 6,7 includes information identifying the network type and information indicative of whether or not the signal carries time-sliced data.

Since the IRDs 6,7 are free to move around the coverage provided by the transmitters 3 to 5, handover situations will occasionally occur. A decision to handover may be made on any appropriate basis. Normally, a decision to handover will be made when it is determined that a measure of signal quality, e.g. the bit error rate (BER), of received signals is deteriorating and will soon be too high to allow reliable decoding of the transmitted data. When a decision to handover is made, the IRD 6 must identify a new signal to receive and decode in place of the currently received signal. With signals, which are time-sliced, the IRD 6 need only listen to the signal on a periodic basis. The interval between transmissions can be used to detect other signals, and it is from these detected signals that a signal must be selected for handover. Accordingly, the selection of a signal for handover requires either a time-sliced signal to be the current signal, or requires two or more RF front ends and decoders, so that two or more signals can be listened to simultaneously. The IRD 6 according to the present invention performs the procedure of FIG. 5 when determining a signal to receive following handover.

Figure 5:
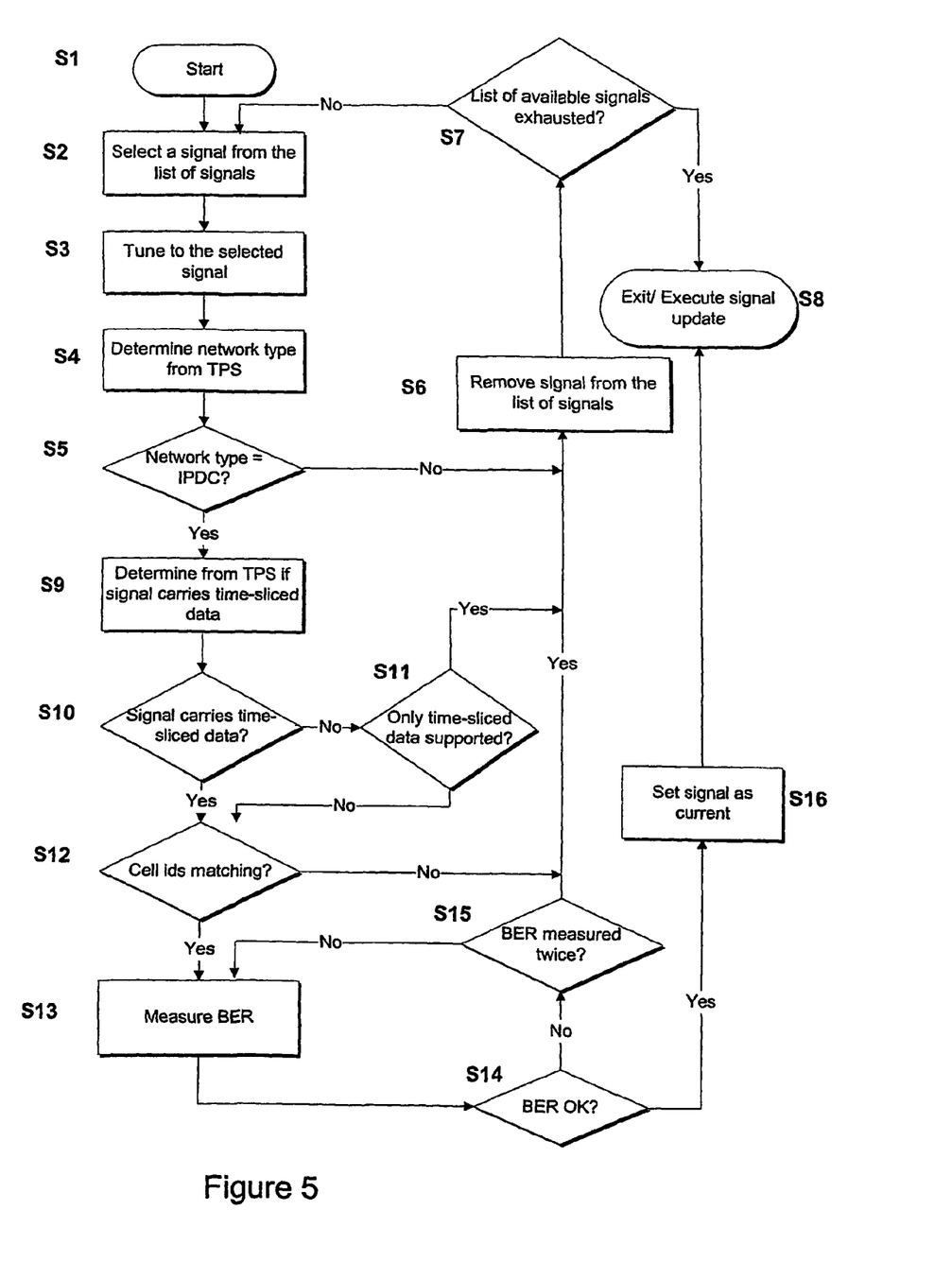
FIG. 5 is a flow diagram illustrating operation of the integrated receiver/decoder of FIG. 3 in a handover procedure.

Referring now to FIG. 5, the procedure begins at step S1 with a list of candidates or available signals. At step S2, a signal is selected from the list of available signals. The signal is tuned to at step S3, following which the TPS data for that signal is decoded and the bit $S_{48}$ thereof is detected. At step S5, it is determined by the CPU 20 from bit $S_{48}$ of the TPS data whether the signal emanates from a network from the type IPDC. If a negative determination is made, the procedure progresses to step S6, where that signal is removed from the list of available signals by the CPU 20. Following this step, at step S7, it is determined by the CPU 20 whether or not the list of available signals has been exhausted, i.e., that there are no further signals available for checking. Assuming that there are further signals available for checking, the procedure progresses again to step S2. Otherwise, it is inferred that all available signals have been checked without success and the procedure progresses to step S8, where the procedure is terminated.

If at step S5, the network type is determined to be IPDC, then the procedure progresses to step S9. Here, the bit $S_{55}$ of the TPS is examined. At step S10, it is determined by the CPU 20 from this inspection of bit $S_{53}$, whether or not the current signal carries time-sliced data. If a positive determination is made, because bit $S_{53}$ has a value of "0", the operation processes to step S11. Otherwise, progression is made to step S11, where it is determined by the CPU 20 whether or not the IRD supports signals which are not time-sliced as well as those which are time-sliced. The IRD 6 can support non-time-sliced signals if, for example, it contains two RF front ends and decoders. If at step S11 it is determined by the CPU 20 that only time-sliced data is supported, progression is made to step S6, where the signal is removed from the list of available signals. Otherwise, the procedure progresses to step S12. At step S12, it is determined by the CPU 20 from the cell ID constituted by bits $S_{40}$ to $S_{47}$ of the TPS data whether the signal emanates from the same cell as one for which a signal was included in the "possible signals" list by the procedure of FIG. 4. If a negative determination is made by the CPU 20, the signal is determined not to be a suitable candidate, and progression is made to step S6. Otherwise, it is inferred that the signal is a suitable candidate, and progression is made to step S13. Here, the BER of the signal is measured by the CPU 20, following which it is compared to a threshold at step 14. If the threshold is exceeded, indicating that the BER is too high, it is determined by the CPU 20 at step S15 whether a BER for that signal has been measured twice. If it has not, then the BER is again measured at step S13. The inclusion of step S15 allows signals to have two opportunities to pass a BER test. If the test is failed, progression is made to step S6. Otherwise, progression is made from step S14 to step S16. Here, the signal being processed is set as the "current signal". It is the current signal to which handover is made by a subsequently performed procedure. After step S16, progress is made to step S8, where the signal is updated and the procedure is exited.

It will be appreciated that the procedure shown in FIG. 5 provides a particularly convenient scheme for eliminating unsuitable signal candidates from a list of available signals for handover. This is made possible only because information indicating the type of the network and information indicating whether or not the signal contains time-sliced data is transmitted as part of the TPS data for that signal.

Although in the above embodiment, certain bits of the TPS data are allocated to certain defined purposes, it will be appreciated that strict adherence to this scheme is not essential. On the contrary, of the six TPS data bits which are currently reserved for future use, any number of them may be used to implement one or more of the embodiments of the invention described herein. Below is listed, as an example, suggested uses for bits of the TPS data, together with an explanation of the meanings of the values that the bits can take.

One bit, as defined in Table 3, may be used for signaling the network type of the network to which the signal relates. Network type can be categorised accordingly to the characteristics of the network.

TABLE 3

| Bit n | Network type |
|---|---|
| 0 | DVB |
| 1 | IPDC |

Although not shown in a table, bits of the TPS data could be used to indicate signals relating to any other type of network instead of or in addition to the IPDC and DVB network types.

Two bits, as defined in Table 4, may be used for signaling information concerning the composition of the multiplexes carried in the network to which the signal relates. Multiplex information is heterogeneous if all multiplexes in the prevailing network are mutually different. Homogenous multiplex information indicates that all multiplexes in the prevailing network carry exactly the same services. Mixed multiplex information is used to indicate that the prevailing network consists both of mutually heterogeneous and homogeneous multiplexes. In Table 4, bits m and n may or may not be adjacent

TABLE 4

| Bits m, n | Multiplex information |
|---|---|
| 00 | Heterogeneous multiplexes |
| 01 | Homogeneous multiplexes |
| 10 | Mixed multiplexes |
| 11 | Reserved for future use |

One bit, as defined in Table 5, can be used to indicate whether the network topology is multiple (MFN) of single frequency (SFN) in type.

TABLE 5

| Bit n | Topology information |
|---|---|
| 0 | SFN |
| 1 | MFN |

One bit, as defined in Table 6, can be used to indicate whether the cells in the prevailing network, i.e. the network from which the signal emanates, all have the same size or if the cells have different sizes.

TABLE 6

| Bit n | Cell size information |
|---|---|
| 0 | Cells have same sizes |
| 1 | Cells have different sizes |

Two bits, as defined in Table 7, may be used to indicate the mapping between multiplexes and cells of the prevailing network. From this, it can be determined if the network consist only of cells covering only one multiplex, only of cells covering two or mote multiplexes or of cells covering one or more multiplexes. Here, bits m and n may or may not be adjacent in the TPS data.

TABLE 7

| Bits m, n | Cell to multiplex mapping |
|---|---|
| 00 | All cells of the network consists of only one multiplex |
| 01 | All cells of the network consists of two or more multiplexes |
| 10 | All cells of the network consist of one or more multiplexes |
| 11 | Reserved for future use |

One bit, as defined in Table 8, can be used to signal the mapping between the current multiplex and other multiplexes that are part of the same cell.

TABLE 8

| Bit n | Current cell to multiplex mapping |
|---|---|
| 0 | Current cell consists of only one multiplex. |
| 1 | Current cell consists of two or more multiplexes. |

Two bits, as defined in Table 9, can be used to signal the cell size diameter (in kilometers) of the cell consisting the currently tuned signal. The cell diameters in Table 7 should be understood to be only examples. Bits m and n may or may not be adjacent in the TPS data.

TABLE 9

| Bits m, n | Current cell diameter (km) |
| --- | --- |
| 00 | <30 |
| 01 | ≥30 < 40 |
| 10 | ≥40 < 50 |
| 11 | ≥50 |

In an alternative embodiment, only one bit may be used to describe the cell diameter. Here, a databit "0" can indicate that the cell diameter is equal to or less than a selected diameter e.g. 30 km and a databit "1" means that the cell diameter is greater than selected diameter.

Two bits, as defined in Table 10, may be used to signal whether or not the currently tuned signal carries time sliced elementary streams and whether a time-sliced stream has an additional or different framing structure, such as e.g. FEC (forward error correction).

TABLE 10

| Bit n | Current signal time slice information |
| --- | --- |
| 00 | Current signal carries time sliced elementary streams |
| 01 | Current signal does not carry time sliced elementary streams |
| 10 | Current signal carries time sliced elementary streams and has an additional framing structure (containing e.g. FEC) |
| 11 | Reserved for future use. |

The selection of which of the above information to select for inclusion in the TPS data transmitted with a particular network depends on a number of factors. It is possible also for more than six bits to be used. In this case, different information bits may be transmitted on different transmissions of the TPS data. For example, data bits identifying network type, current cell multiplex and current cell size may be transmitted on even numbered transmissions of the TPS data, whereas network multiplex information and network cell size information may be transmitted in the corresponding bits on odd numbered transmissions of the TPS data. An IRD may be able to distinguish between the different transmissions using, for example, the synchronisation bits transmitted therewith.

In an enhanced embodiment, the TPS data may include two bits which identify multiplexing use in the network and in the signal to which the TPS data relates. This embodiment avoids the need for four bits to be used to describe the network and the current cell multiplex information. The two bits preferably are used as shown in Table 11 below.

TABLE 11

| 00 | All cells consist of only one multiplex |
| --- | --- |
| 01 | All cells consist of two or more multiplexes |
| 10 | Current cell consists of only one multiplex |
| 11 | Current cell consists of two or more multiplexes |

Table 11 illustrates a principle which can be applied to others of the TPS bits. In particular, where there are two or more separate elements of the TPS data some combinations of which are not relevant or applicable, combining those two or more elements together may allow all the relevant combinations to be expressed using fewer data bits than would be possible if the elements were treated separately.

Thus, in view of the foregoing and according to an embodiment of the invention, a terrestrial digital video broadcast (DVB-T) network includes a content provider 2 and first to third transmitters 3 to 5. Each transmitter may transmit more than one signal, different signals having different frequencies, multiplexes and the like and relating to different network types. An integrated receiver/decoder (IRD) 6 is mobile in the area around transmitters 3 to 5. As well as transmitting service information as part of a network information table on a data layer, the transmitters 3 to 5 provide in their output signals transmitter parameter information as TPS data on a physical layer. This TPS information includes one bit identifying the type of the network to which the signal relates and information identifying whether or not the signal contains time-sliced data streams. This information is used by the IRD 6 both in signal scan, or initialising the IRD with parameters needed for OSI layers 1 to 2 service discovery, and for deselecting signals as handover candidates. Since the transmission parameter information is transmitted more frequently and in a lower OSI layer than the network information table, the IRD can more efficiently make decisions as to whether or not a signal is suitable for handover, or is otherwise a signal of interest.

Although the above embodiments have been described in relation to the DVB broadcast system, it will be appreciated that that the principles can be transferred to other broadcast systems or to multicast or unicast systems. Such a system may be the Advanced Television System (ATSC) or the Japanese Integrated Services Digital Broadcasting (ISDB) system, to list some non-limiting examples.

Moreover, the invention is not limited to the specific examples given above, but by the scope of the appended claims.

The invention claimed is:

1. A method comprising:
decoding in a receiver transmission parameter signaling data from a signal, the transmission parameter signaling data comprising a predetermined number of data bits defined over consecutive orthogonal frequency division multiplex symbols, the transmission parameter signaling data comprising at a predetermined location a group of information bits having a state dependent on whether the signal to which the transmission parameter signaling data relates carries time-sliced elementary streams having a forward error correction framing structure;
determining from the group of information bits at the predetermined location if the signal carries time-sliced elementary streams; and
determining from the group of information bits at the predetermined location whether the signal has a forward error correction framing structure.

2. An apparatus comprising:
a decoder configured to decode transmission parameter signaling data from a signal, the transmission parameter signaling data comprising a predetermined number of data bits defined over consecutive orthogonal frequency division multiplex symbols, the transmission parameter signaling data comprising at a predetermined location a group of information bits having a state dependent on whether the signal to which the transmission parameter signaling data relates carries time-sliced elementary streams having a forward error correction framing structure;
a determiner configured to determine from the group of information bits at the predetermined location if the signal carries time-sliced elementary streams and configured to determine from the group of information bits at the predetermined location whether the signal has a forward error correction framing structure.

3. Apparatus configured to provide, with a transmission parameter signalling (TPS) data generating device, a signal for transmission, the apparatus being further configured to provide, with the TPS data generating device, transmission parameter signaling data comprising a predetermined number of data bits defined over consecutive orthogonal frequency division multiplex symbols, the transmission parameter signaling data comprising at a predetermined location a group of information bits having a state dependent on whether the signal to which the transmission parameter signaling data relates carries time-sliced elementary streams having a forward error correction framing structure.

4. Apparatus configured to provide, with a transmission parameter signalling (TPS) data generating device, a signal for transmission, the apparatus being further configured to provide, with the TPS data generating device, a transmission parameter signaling data signal for inclusion on a lower level of a signal to which the transmission parameter signaling data signal relates than a level of the signal to which the transmission parameter signaling data signal relates on which service information is included, the transmission parameter signaling data signal comprising a predetermined number of data bits defined over consecutive orthogonal frequency division multiplex symbols, the data signal comprising at a predetermined location a group of two information bits having a state dependent on whether a signal to which the data signal relates carries time-sliced elementary streams having a forward error correction framing structure.

* * * * *